(12) United States Patent
Agnihotri (10) Patent No.: US 8,533,955 B2
(45) Date of Patent: Sep. 17, 2013

(54) UNIVERSAL ADJUSTABLE BRACKET APPARATUS FOR SUPPORTING AIR CONDITIONERS AND OTHER DEVICES

(76) Inventor: Pawan Agnihotri, Hartsdale, NY (US)

( * ) Notice: Subject to any disclaimer, the term of this patent is extended or adjusted under 35 U.S.C. 154(b) by 125 days.

(21) Appl. No.: 13/310,493

(22) Filed: Dec. 2, 2011

(65) Prior Publication Data

US 2012/0137499 A1 Jun. 7, 2012

Related U.S. Application Data

(60) Provisional application No. 61/419,807, filed on Dec. 4, 2010.

(51) Int. Cl.
*B21D 47/01* (2006.01)
(52) U.S. Cl.
USPC ....... 29/897.3; 29/897.31; 248/674; 248/208; 248/209
(58) Field of Classification Search
USPC ...... 29/525.01, 525.11, 469, 897.3; 248/674, 248/208, 236, 209, 235, 241
See application file for complete search history.

(56) References Cited

U.S. PATENT DOCUMENTS

| | | | | |
|---|---|---|---|---|
| 510,194 | A * | 12/1893 | Sellers | 248/236 |
| 652,010 | A * | 6/1900 | Wheeler | 248/236 |
| 1,224,127 | A * | 5/1917 | Bartlett | 248/208 |
| 1,321,869 | A * | 11/1919 | Wilson | 182/100 |
| 1,512,792 | A | 4/1923 | Nelson | |
| 1,701,301 | A * | 2/1929 | Goodwin | 248/240.3 |
| 2,717,139 | A | 9/1955 | Jewell | |
| 2,880,952 | A | 4/1959 | Moore et al. | |
| 2,891,754 | A * | 6/1959 | Kuhlenschmidt et al. | 248/208 |
| 2,935,284 | A * | 5/1960 | Reeves | 248/208 |
| 3,273,843 | A | 9/1966 | Bell, Jr. et al. | |
| 3,394,910 | A * | 7/1968 | Ulich | 248/208 |
| 5,167,131 | A | 12/1992 | Karkhanis | |
| 5,259,477 | A * | 11/1993 | Fears et al. | 182/82 |
| 5,636,816 | A | 6/1997 | Burton et al. | |
| 6,738,094 | B1 * | 5/2004 | Minami et al. | 348/373 |
| 6,767,278 | B1 | 7/2004 | Peterson | |
| 7,572,073 | B2 * | 8/2009 | Kenoyer et al. | 396/428 |
| 8,091,844 | B1 * | 1/2012 | Bragg | 248/208 |
| 8,167,260 | B2 * | 5/2012 | Boccia et al. | 248/236 |

* cited by examiner

*Primary Examiner* — David Bryant
*Assistant Examiner* — Justin Sikorski (57) ABSTRACT

An apparatus for a universal bracket support including an L frame including a short arm coupled at a substantially right angle to a long arm with each having a plurality of spaced holes extending along each corresponding length; and a slider arm including an extension leg having a slide guide coupled on one end of the extension leg, wherein the slide guide includes a plurality of spaced holes and an opening sized to slide over and be secured to the L frame, and a shoe coupled via a pivot coupling to another end of the extension leg.

16 Claims, 8 Drawing Sheets

UNIVERSAL ADJUSTABLE BRACKET APPARATUS FOR SUPPORTING AIR CONDITIONERS AND OTHER DEVICES

This application claims priority of U.S. Provisional Patent Application Ser. No. 61/419,807 filed Dec. 4, 2010, the entire contents of which is incorporated herein by reference thereto.

BACKGROUND OF THE PRESENT SYSTEM

The present system relates to a bracket used in window openings and walls for supporting air conditioners and like.

Air conditioner (AC) units for cooling rooms are highly popular and these units are ubiquitous in homes and apartment buildings alike. The usual method of installing such equipment is to fasten it into the window opening and lower the window to close the window opening space above it. An air conditioner is rather heavy and extends a substantial horizontal distance outside the building and beyond the window opening and frame. An AC unit can easily weigh over 100 pounds. They are therefore most difficult to secure within the window frame and when the window is raised, may fall outwardly. This could cause quite serious accidents if the air conditioner unit happens to be on a high rise building. So far air conditioners have been perfected and have been selling for a long time. However, no sensible, compact, and easy to install device has been conceived to successfully secure and support it in a window opening.

Peterson, U.S. Pat. No. 6,767,278, the entire contents of which is incorporated herein by reference thereto, discloses a window mounted air conditioner installation system that secures an air conditioner in a window opening while allowing a user to open and close the window. The system of apparatus includes; base plate which is mounted on the window sash and has central section, an inverted U-shaped indoor section, and an inverted L-shaped for supporting the air conditioner thereupon; and a two-piece telescoping support bar having a hollow rectangular first bar member and a rectangular second bar member slidably mounted therein with elastomeric end stoppers at the outer ends of the bars. The support bar is extended such that the end stoppers fit into the vertical side supports of the window frame in which the vertical sides of the window slide and is locked into the extended position on top of the air conditioner by a cam lever type locking member on the support bar.

Burton et al, U.S. Pat. No. 5,636,816, the entire contents of which is incorporated herein by reference thereto, discloses a universal air conditioner mounting bracket for supporting a window air conditioner on a window sill in a window opening. The bracket includes: a generally horizontal support member attached to the window sill for supporting the outside portion of the air conditioner; a foot that rests against an outside surface of the wall below the window opening; a strut member having an upper end attached near a distal end of the support member and a lower end thereof attached to the foot member; and apparatus to selectively adjust height of the proximal end of the support member above the window sill.

Karkhanis, U.S. Pat. No. 5,167,131, the entire contents of which is incorporated herein by reference thereto, discloses a saddle type room air conditioning unit wherein evaporator and condenser housings are supported in a fixed relationship by a connecting portion affording support for the housings and controlled air flow communication between the housings. Sealing devices are releasably latched to the connecting portion and cooperate therewith to completely seal the unit vertically relative to a window sill and sash and horizontally between vertical sides of a window frame. A latching device is also disclosed for adjustably releasably latching upper and lower window sashes relative to one another, as required to prevent unauthorized removal of the unit from a window opening.

SUMMARY OF THE PRESENT SYSTEM

It is an object of the present system to overcome disadvantages and/or make improvements in the prior art. One or more of the following objects may be achieved through use of the present system.

It is therefore one of the objects of the present system to provide a rigid support means that for example may be utilized for holding an air conditioner or like in a window opening, a wall of a building, a home, etc.

A further object of the present system is to provide a bracket for window openings that may be easily and quickly installed in or removed from the opening of a window.

A still further object of the present system is to provide a bracket support for window openings that does not damage or mar the window frame or the building.

A still further object of the present system is to provide a window bracket support that is adjustable to fit different window openings and wall widths, external wall angles, and finishes.

A still further object of the present system is to provide a bracket which is light and easy to carry.

Further object of the present system is to provide a bracket which has very few pieces and can be installed with minimum tools and a few fasteners such as screws, nuts and bolts, etc.

Still further objects of the present system are to provide a support base that is economical to manufacture, durable to use, and refined in appearance.

These and other objects that may be achieved will be apparent to those skilled in the art.

The present system includes method and an apparatus for a universal bracket support including an L frame including a short arm coupled at a substantially right angle to a long arm with each having a plurality of spaced holes extending along each corresponding length; and a slider arm including an extension leg having a slide guide coupled on one end of the extension leg, wherein the slide guide comprises an opening sized to slide over and be secured to the L frame, and a shoe coupled via a pivot coupling to another end of the extension leg. The apparatus may include one or more fasteners securing the L frame to the slide guide. One or more bolts and one or more corresponding nuts may be provided affixed to an underside of the slide guide, wherein the slide guide is secured to the L frame with the one or more bolts inserted through corresponding holes and is coupled to the one or more corresponding nuts. The shoe may include a rubber sole and a flat rectangular piece having a first side coupled to the pivot coupling and a second opposing side coupled to the rubber sole. The plurality of spaced holes of the long arm may be a first plurality of holes. The slide guide may include a second plurality of holes extending along a length of the slide guide, wherein a spacing between the first plurality of holes is different than a spacing between the second plurality of holes such that the slide guide is securable along a length of the long arm in increments smaller than the first spacing.

BRIEF DESCRIPTION OF THE DRAWINGS

The present bracket system includes the construction, arrangements, and combination, of the various parts of the device, whereby the objects contemplated are attained as hereinafter more fully set forth, specifically pointed out in the claims, and illustrated in the accompanying drawings, in which:

DETAILED DESCRIPTION OF THE PRESENT SYSTEM

The following are descriptions of illustrative embodiments that when taken in conjunction with the following drawings will demonstrate the above noted features and advantages, as well as further ones. In the following description, for purposes of explanation rather than limitation, illustrative details are set forth. However, it will be apparent to those of ordinary skill in the art that other embodiments that depart from these details would still be understood to be within the scope of the appended claims. Moreover, for the purpose of clarity, detailed descriptions of well-known devices, techniques, and methods are omitted so as not to obscure the description of the present system. It should be expressly understood that the drawings are included for illustrative purposes and do not represent the scope of the present system. In the accompanying drawings, like reference numbers in different drawings may designate similar elements.

While the device is illustratively described as appropriate for supporting an air conditioner in a window opening, obviously it may be used wherever a support base is desired.

Figure 1A:
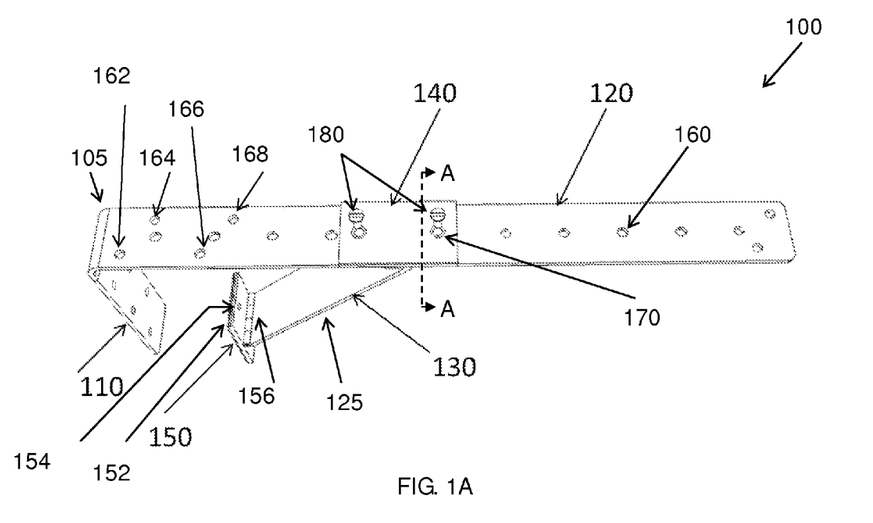
FIG. 1A shows a bracket in accordance with embodiments of the present system.

FIG. 1A shows a bracket 100 in accordance with embodiments of the present system. The bracket may include two main pieces, an L frame 105 and a slider arm 125. The L frame 105 may include a long arm 120 coupled to a short arm 110. One more of the long arm 120, the short arm 110, and the slider arm 125 may have one or more circular holes 160, 170 present extending through the respective arms 120, 110, 125. The long arm 120 may be coupled to the short arm 110 forming a substantially 90 degree angle there between. Each of the L frame 105 and the slider arm 125 are formed from a rigid material such as a metal. For example one or more of the L frame 105 and the slider arm 125 may include aluminum, steel, stainless steel, etc. as may be readily appreciated and may be further coated with a coating for aesthetics (e.g., coloring) and/or functionality (e.g., rust resistance).

The slider arm 125 includes a slide guide 140, an extension leg 130, and a shoe 150. In accordance with embodiments of the present system, the slider arm 125 is configured and sized to slide over the L frame 105. In accordance with embodiments of the present system, the slide guide 140 may be fixedly attached to the extension leg 130 to provide a predetermined angle there between, such as in a range of between 30 degrees to 55 degrees, such as 45 degrees, to provide a supporting angle to the bracket 100 as further described herein. As illustratively shown, the shoe 150 comprises a rectangular portion formed from a rigid material such as a metal. In accordance with embodiments of the present system, the shoe 150 is rotatably affixed (e.g., using a hinge-like attachment 156) to the extension leg 130 so that an angle formed by the shoe 150 and the extension leg 130 may be adjusted to accommodate different exterior wall angles as further described.

The slider arm 125 provides flexibility and versatility to the bracket in accordance with embodiments of the present system and enables it to be used in a variety of applications. Embodiments of the present system enables the bracket to be installed easily and simply over the windows, and enables the bracket itself to be compact and assembled for example using only a few fasteners such as screws and a screw driver. The sliding design in accordance with embodiments of the present system allows the bracket to be adjustable to various wall thicknesses, as well as, adaptable to different external wall angles and finishes.

The usual procedure in the installing of an air conditioner is to raise the window, place the air conditioner into the window opening, and then lower the window downwardly onto the air conditioner. Using one or more brackets described in accordance with embodiments of the present application, the one or more brackets are first placed and secured over the window opening. The AC may then be placed on the one or more such brackets secured to the window base. Finally, the window may be lowered downwardly onto the air conditioner.

Figure 1B:
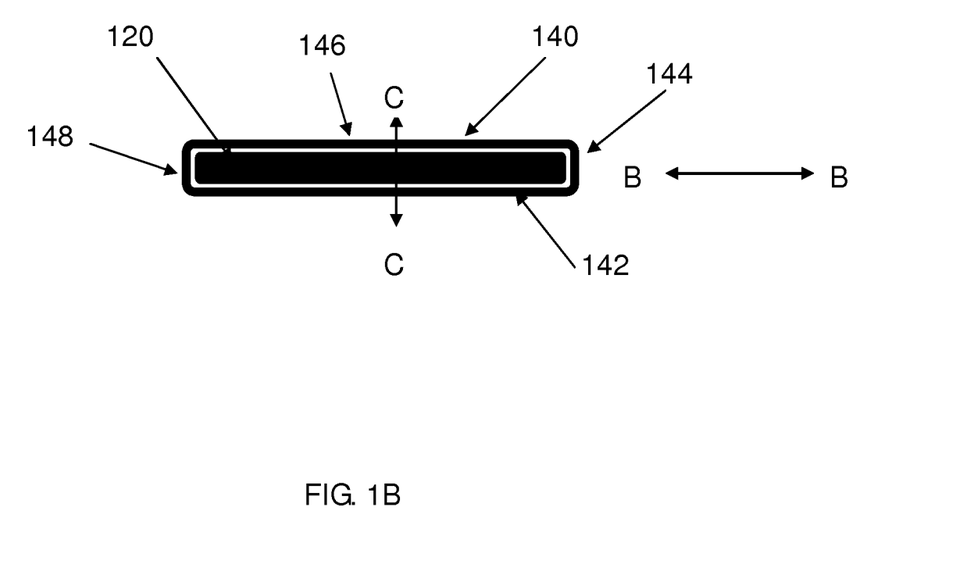
FIG. 1B shows a portion of the bracket of FIG. 1A along a cross sectional line A-A in accordance with embodiments of the present system.

In the picture of the bracket shown in FIG. 1A, both of the long arm 110 and the short arm 120 have a plurality of circular openings (e.g., the circular holes 160, 170) along the length of the frame. In accordance with embodiments of the present system, the slide guide 140 is sized to slidably adjust along a length of the long arm 120. FIG. 1B shows a portion of the bracket of FIG. 1A viewed from an edge of the bracket along a cross sectional line A-A in accordance with embodiments of the present system. As shown, the long arm 120 has a substantially rectangular cross section and the slide guide 140 has a substantially rectangular cross section formed from walls 142, 144, 146, 148 that surround a space that is sized similar as the cross section of the long arm 120, however, the space is sized somewhat larger than the cross section of the long arm 120 such that when the long arm 120 is inserted into the space as shown in FIG. 1A, the slide guide 140 may slidably receive the long arm 120. For example, the long arm 120 may have dimensions (height×width) such as 0.125 inches by 1.75 inches and the space may have dimensions 0.235 inches by 1.86 inches. In this way, although the slide guide 140 may slidably receive the long arm 120, however, the long arm is restricted from substantial side-to-side motion along plane B-B and up and down motion along plane C-C.

Figure 3:
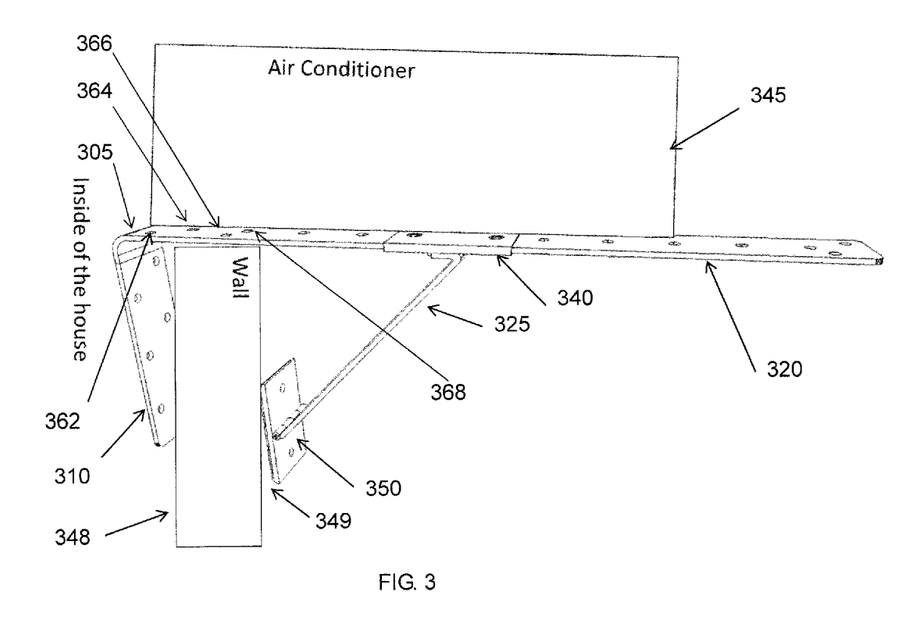
FIG. 3 shows a bracket configuration in accordance with embodiments of the present system.
Figure 9:
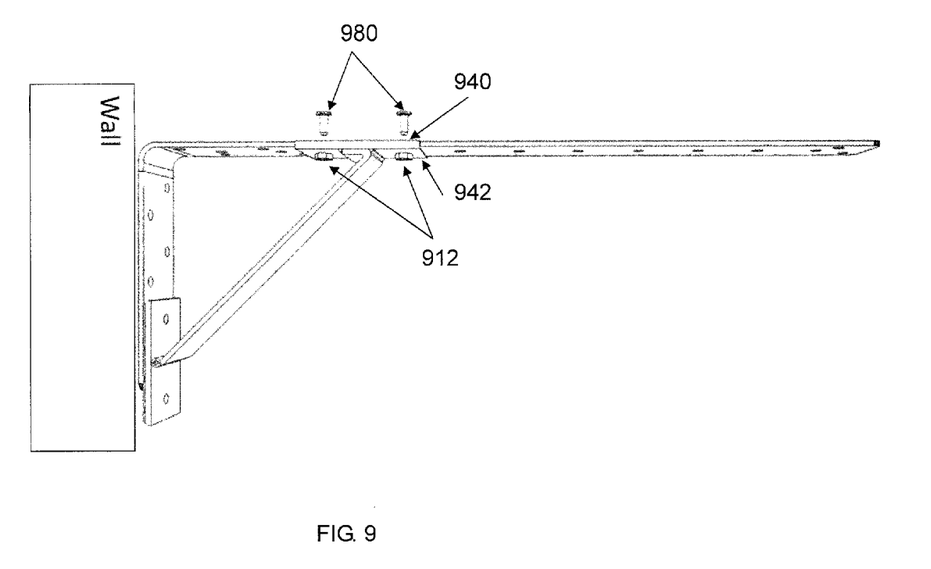
FIG. 9 shows a bracket configuration in accordance with embodiments of the present system for typical requirements around a house for a support bracket.

In accordance with embodiment of the present system, the slide guide 140 slides along the long arm 120 for purposes of accommodating different wall thickness such as shown in FIG. 3. The slide guide 140 may be secured in a given location along the long arm 120, such as by inserting a fastener 180, such as one or more screws and/or nuts through one or more of the corresponding holes 160, 170 thereby, passing through the slide guide 140 and the long arm 120. In an embodiment wherein one or more screws are utilized to secure the slide guide 140 as described, the holes 170 may be threaded to receive a corresponding threading of the fastener 180. In accordance with additional embodiments of the present system, one or more nuts may be affixed to an underside of slide guide 140, such as shown in FIG. 9, wherein nuts 912 are secured to a bottom portion 942 of a slide guide 940. For example, the nuts 912 may be secured to the bottom portion 942 using tack welding, an adhesive, etc. In accordance with embodiments of the present system, securing the one or more nuts 912 makes it easier to install at home as a user does not have to hold the nut 912 and a fastener 980 (e.g., a bolt) both at the same time in order to secure the slide guide 940.

Returning to FIG. 1A, the shoe 150 may include a sole of cushioning material 152 such as a rubber sole adhered to it to make contact with the wall smooth and to prevent any damage to the same. One or more holes 154 may be provided on the bottom of the shoe 150 to enable securing it to the wall for example with a screw, if so desired. However, in accordance with embodiments of the present system, the shoe 150 may be used without any fasteners. As previously discussed, the shoe itself is hingedly affixed to the extension leg 130 such as welding a pivoting piano hinge to the extension leg 130. In this way, the bracket may rest on irregular or angled outside wall. Further, the cushioning material 152 on the shoe 150 allows vibrations to be absorbed by the bracket and are not transferred to the building.

Figure 2:
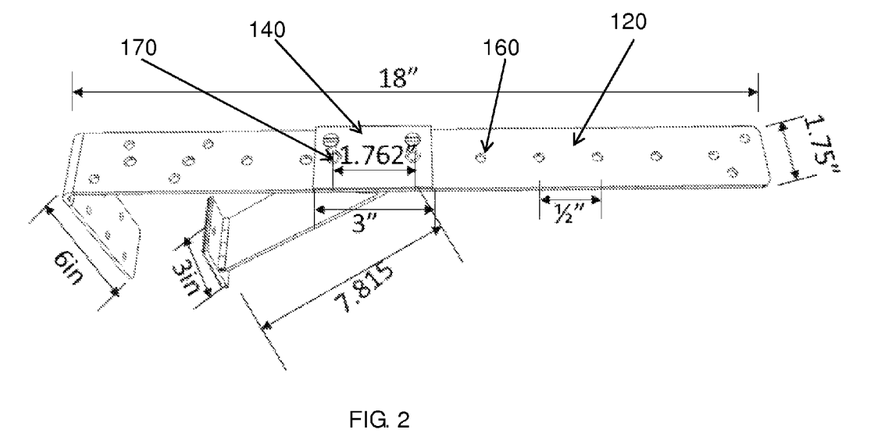
FIG. 2 shows a bracket configuration in accordance with embodiments of the present system including illustrative dimensioning.

FIG. 2 shows a bracket in accordance with embodiments of the present system including illustrative dimensioning shown in inches. In accordance with embodiments of the present system, a hole spacing on the long arm 120 is different than a hole spacing on the slide guide 140. While this configuration of hole spacing means that only one fastener (e.g., fastener 180) may be utilized to secure the slide guide 140 to the long arm 120, however, a finer adjustment is provided without requiring additional holes in the long arm 120. For example, in the illustrative embodiment the holes 160 through the long arm 120 may be spaced apart a distance of ½ inch on center while the holes 170 through the slide guide 140 may be ¼ inch round diameter holes spaced apart a distance of 1.762 inches on center. In this embodiment, the slide guide 140 may be adjusted along the long arm 120 in ⅛ inch increments. In this way, the movement of the slide arm may overlap with one of the holes at every ⅛ inch distance. In these embodiments of the present system, the slide guide may be designed to overlap any one of the two holes in the sliding arm at ⅛ of an inch even though the hole spacing is in ½ inch intervals. As may be readily appreciated, by providing more holes (e.g., more than two) through the slide guide 140, a further adjustment may be provided without requiring additional holes through the long arm 120. In accordance with embodiments of the present system, a second plurality of holes may run the length of the bracket offset from the first plurality of holes to enable further adjustment. In these embodiments, the slide guide 140 would also have a corresponding second plurality of holes.

FIG. 3 shows a bracket installation in accordance with embodiments of the present system. To install an air conditioner 345 unit as shown in this configuration, a long arm 320 of an L frame 305 is placed over a window frame with a short arm 310 sitting inside the window along an inside wall 348. The L frame is secured to the window base using one or more fasteners, such as screws. In accordance with embodiments of the present system, a hole design for securing the L frame to the window opening has an angular placement with respect to a length of the L frame as shown with regard to holes 362, 364, 366, 368 (this is also shown with regard to FIG. 1 and holes 162, 164, 166, 168). This feature is unique over the standard side by side placement of holes typically utilized to secure the brackets. This placement provides for three dimensional stability of the bracket when two or more fasteners are utilized. Placing two holes at an angle in accordance with these embodiments, the bracket is prevented from moving side to side, in and out, and up and down which are more prone to happen when the holes are placed side by side.

The slider arm is placed outside and the slide guide slides along the long arm of the L frame. A slider arm 325 is adjusted to make a shoe 350 fit snugly on an external portion 349 of the wall. The shoe 350 on the external wall and the short arm 310 sitting inside the window grip the wall under the window base and secure the bracket to the wall. Fasteners such as screws may be utilized to secure the shoe 350 to the wall if desired, and one or more fasteners may be inserted and tightened on a slide guide 340 to secure it to the L frame 305. The circular openings are placed strategically along the length of the L frame as well as the slide guide in order to provide for the bracket to be adjusted to a closer tolerance than the actual hole spacings, such as illustratively described to an eighth (⅛) of an inch tolerance to fit all wall widths.

In addition, during installation of the bracket, all that is required is a screw driver. In this configuration, the air conditioning unit sits on top of the long arm 320 of the L frame 305. As discussed above, while it is true that one or more fasteners such as screws may be used to secure the shoe 350 to the external wall if so desired, however, the bracket may be used without using fasteners on the shoe. In accordance with further embodiments of the present system, one or more brackets may be similarly secured over the window base. The AC unit may then be placed on top of these one or more brackets. In accordance with embodiments of the present system, the bracket may be made of steel which provides a bracket that is strong and resilient to forces of nature, such as rain, wind, and cold etc.

To detach the installation, the air conditioner is lifted from the bracket and brought inside the window. The screws (if any) on the outside wall are removed and those in the slide guide are loosened to slide the slider arm out and to release the grip of the bracket to the wall. Finally, the screws used to secure the L frame over the window base are removed. The entire unit can then be lifted from over the window and stored. The replacement is thus easily accomplished. The bracket stores flat and takes very little place. There is, thus no need to collapse the bracket or do any more operations and the whole process is accomplished easily and quickly.

Using the same parts as previously described, multiple external support configurations are possible for the bracket in an opening such as a window opening.

Figure 4:
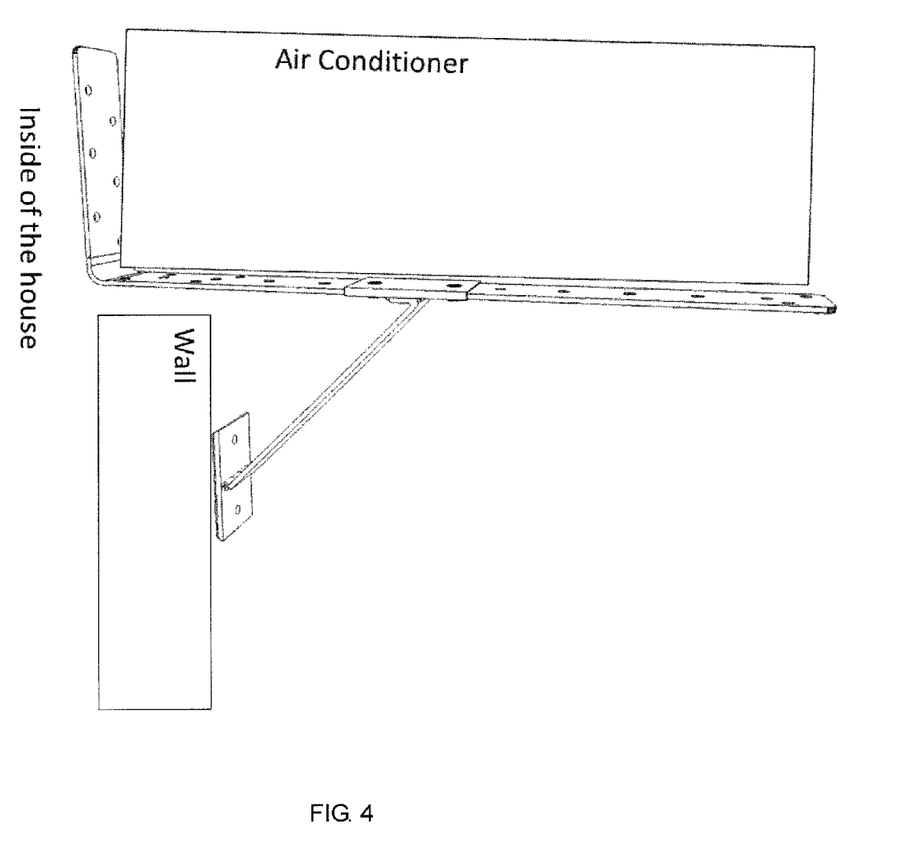
FIG. 4 shows a bracket configuration in accordance with embodiments of the present system.

FIG. 4 shows a bracket in accordance with embodiments of the present system in a configuration that may be utilized as security feature to prevent the AC from being pushed in from outside and used as an opening for thieves etc. to gain entry into the house. In this support configuration, the short arm of the L frame extending upward inside the window in front of the AC and the slide guide of the slider arm slides over the long arm of the L frame under the outside of the window with the shoe resting on the external wall. This configuration provides for AC push in security as the short arm prevents the AC unit from being pushed inside from outside.

Figure 5:
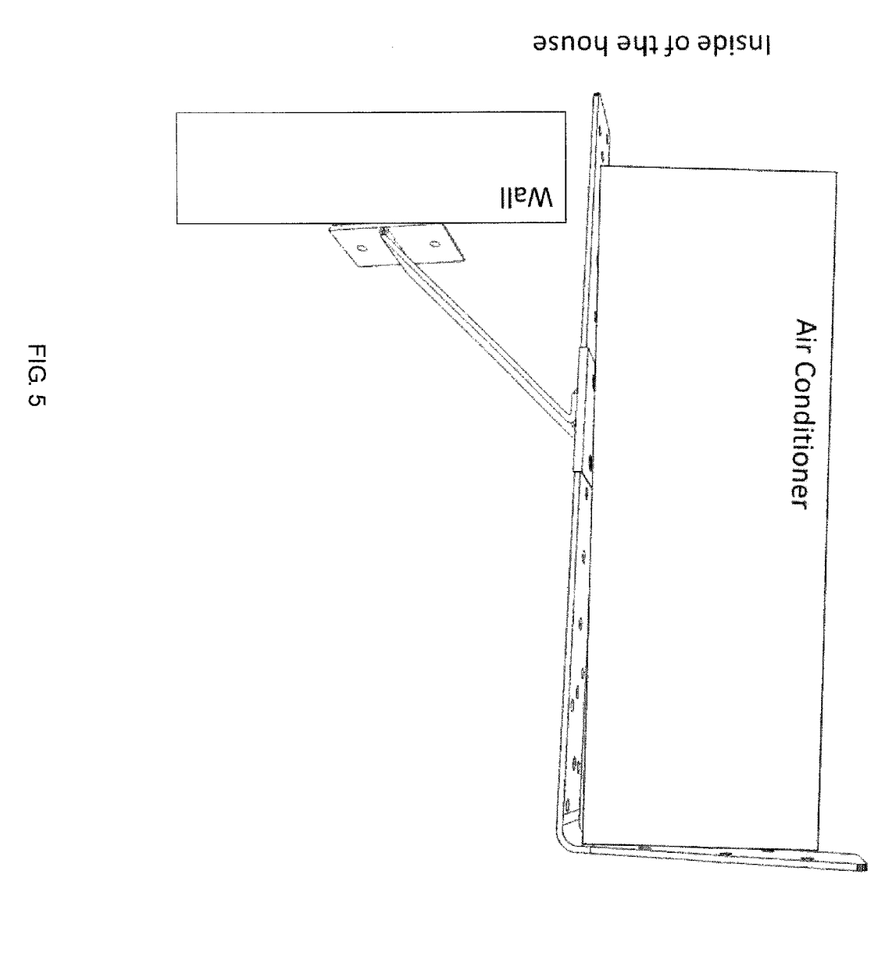
FIG. 5 shows a bracket configuration in accordance with embodiments of the present system.

FIG. 5 shows a bracket configuration in accordance with embodiments of the present system wherein the bracket supports the AC unit from behind with the short arm of the L frame facing up outside the window behind the AC. The slide guide of the slider arm slides over the long arm of the L frame under the outside of the window with the shoe resting on the external wall for AC push out security. Further, this configuration is advantageous for multi-story building installations above the first floor where push in security is not as important a consideration as security from the air conditioner falling outward and potentially down on a busy street or sidewalk.

Figure 6:
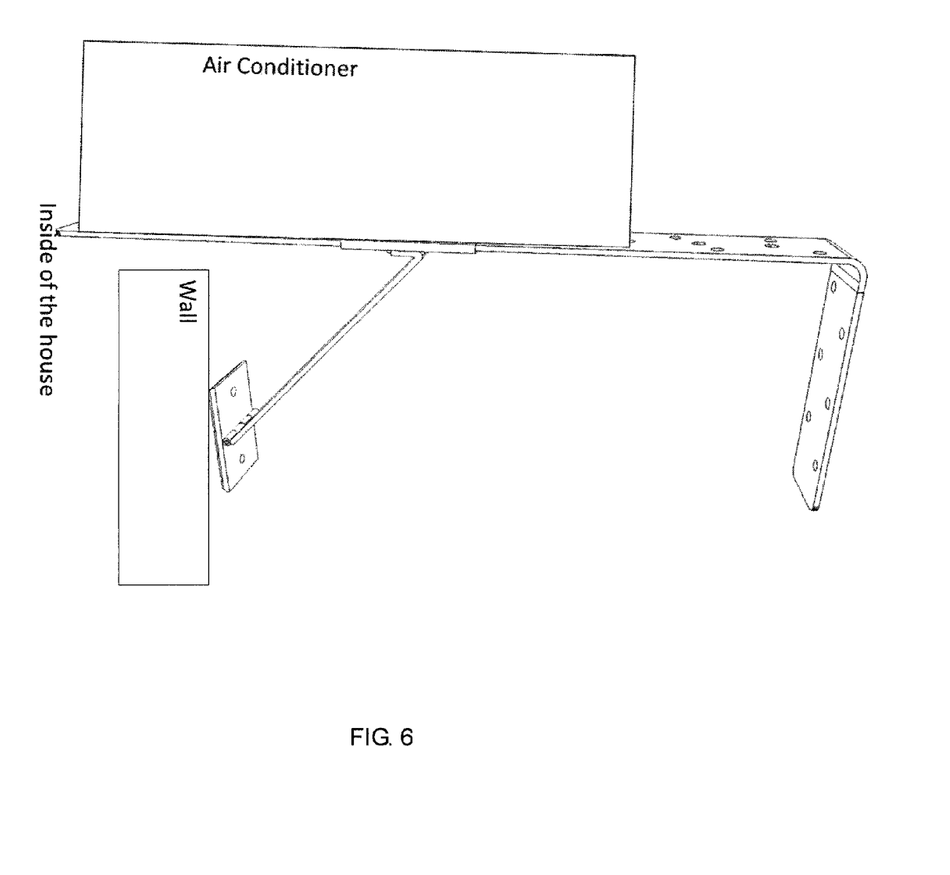
FIG. 6 shows a bracket configuration in accordance with embodiments of the present system.

FIG. 6 shows a bracket configuration in accordance with embodiments of the present system. In this configuration the short arm of the L frame is positioned outside the window extending down below the AC. The slide guide of the slider arm slides over the long arm of the L frame under the outside of the window with the shoe resting on the outside wall. This configuration may be beneficial for supporting extra long ACs although long ACs may also be well accommodated by the configurations shown in FIGS. 1-3.

In accordance with embodiments of the present system, besides being a window support for ACs, the bracket may also be easily adapted to be used for other tasks around the house and businesses. In accordance with embodiments of the present system, the bracket can be secured to a wall and the slider arm may be used to give additional support.

Figure 7:
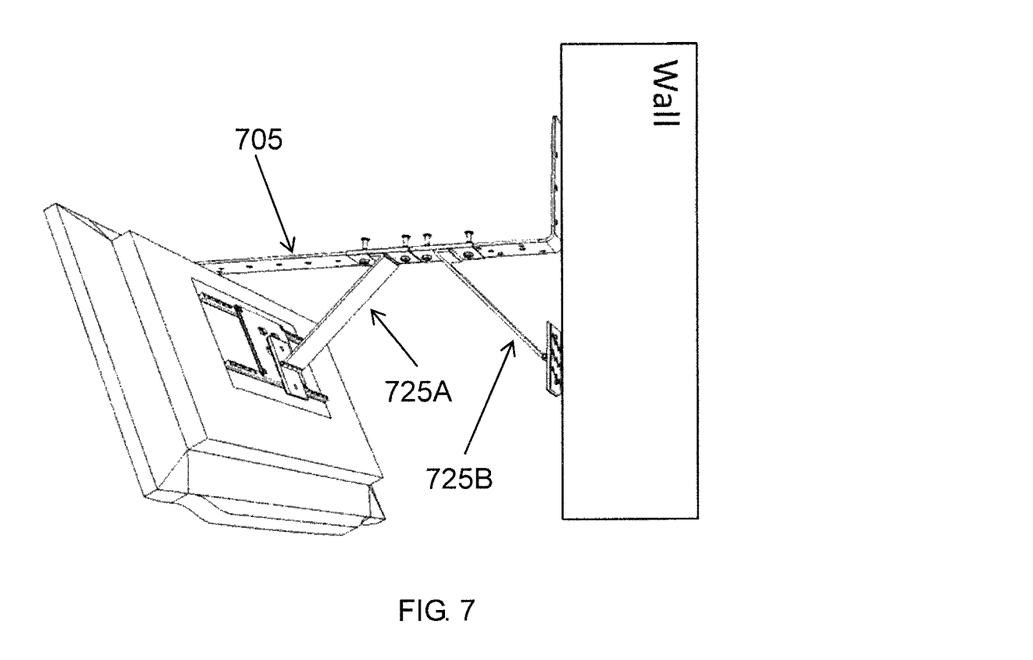
FIG. 7 shows a bracket configuration in accordance with embodiments of the present system for hanging a TV on a wall.

FIG. 7 shows a bracket configuration in accordance with embodiments of the present system for hanging a TV on a wall. In accordance with these embodiments, one L frame 705 is used along with two slider arms 725A, 725B to hang a television from a wall. In this configuration, the short arm of the L frame 705 is secured to the wall. One slider arm is secured to the L frame and its shoe is secured to the wall. Another slider arm is also used and is secured to the long arm of the L frame. The shoe of this arm is used to secure the TV etc.

The configuration shown in FIG. 4 that is described above for AC push in security may be used for providing "overhanging hooks" around the house. In this way, the bracket may be used for supporting planters etc. over a window sill, rails, deck walls, and such.

Figure 8:
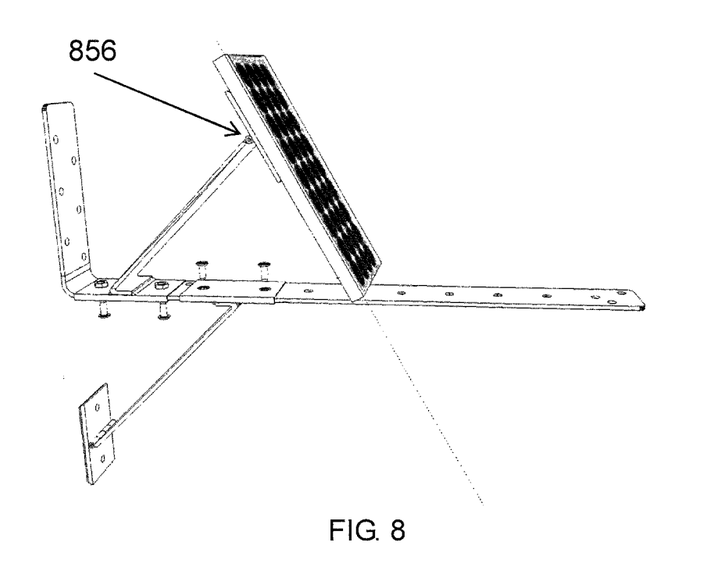
FIG. 8 shows a bracket configuration in accordance with embodiments of the present system for supporting solar panels on a roof.

FIG. 8 shows a bracket configuration in accordance with embodiments of the present system for supporting a solar panel 890 wherein multiple slider arms for each bracket used may support the solar panel. In accordance with embodiments of the present system, the shoe rather than being piano hinged to the slider arm, may utilize a variable tension shoe screw hinge 856 which enables it to be positioned at a desired angle to support the solar panel. The solar panel may then rest on the shoe which is held at the desired angle. The bottom of the solar panel may rest on the long arm of the L frame and the short arm may be secured to the roof, etc.

FIG. 9 shows a bracket configuration in accordance with embodiments of the present system for typical requirements around a house such as for a support bracket for shelving, etc. In this way, one or more of the brackets may be used indoors to provide support for holding shelves and devices as desired. In this configuration, the short arm of the bracket is secured to the wall. The slider arm slides over the long arm and the shoe is also secured to the wall below the short arm of the L frame. In accordance with these configurations, two or more brackets may be placed side by side to be utilized to hold a shelf, microwave, and other things.

Figure 10:
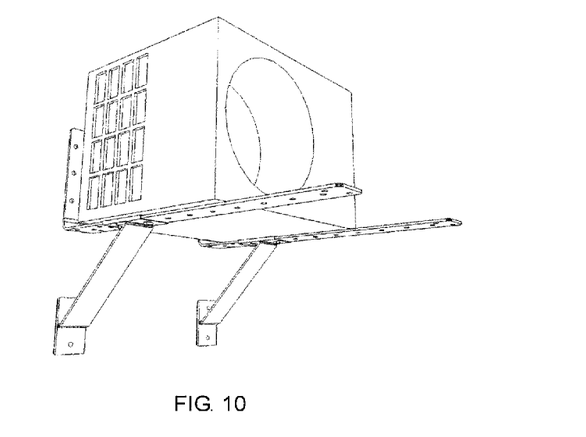
FIG. 10 shows a bracket configuration in accordance with embodiments of the present system.

FIG. 10 shows a bracket configuration in accordance with embodiments of the present system wherein a pair (or more) of brackets is secured with the short arm of the L frame to the wall and the slide guide of the slider arm slide onto the long arm of the L frame. The shoe of the slider arm is attached to the wall under the L frame so as to provide superior support to the equipment resting on the long arm of the L frame as the weight is distributed to both the bracket parts.

Countless other variations are possible to enable these brackets to be used in multiple places and different purposes and are intended encompassed by the following claims.

It is to be understood here that the embodiment and variations shown and described herein are merely illustrative of the principles of this present system and that various modifications may be implemented by those skilled in the art without departing from the scope and spirit of the present system.

Finally, the above-discussion is intended to be merely illustrative of the present system and should not be construed as limiting the appended claims to any particular embodiment or group of embodiments. Thus, while the present system has been described with reference to exemplary embodiments, it should also be appreciated that numerous modifications and alternative embodiments may be devised by those having ordinary skill in the art without departing from the broader and intended spirit and scope of the present system as set forth in the claims that follow. In addition, the section headings included herein are intended to facilitate a review but are not intended to limit the scope of the present system. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts or steps is intended to be required unless specifically indicated; and i) the term "plurality of" an element includes two or more of the claimed element, and does not imply any particular range of number of elements; that is, a plurality of elements may be as few as two elements, and may include an immeasurable number of elements.

What is claimed is:

1. An apparatus for a universal bracket support, the apparatus comprising:
   an L frame including a short arm coupled at a substantially right angle to a long arm with each having a plurality of spaced holes extending along each corresponding length; and
   a slider arm including an extension leg having a slide guide coupled on one end of the extension leg, wherein the slide guide comprises an opening sized to slide over and be secured to the L frame, and a shoe coupled via a pivot coupling to another end of the extension leg.

2. The apparatus of claim 1, comprising one or more fasteners securing the L frame to the slide guide.

3. The apparatus of claim 1, comprising one or more bolts and one or more corresponding nuts affixed to an underside of the slide guide, wherein the slide guide is secured to the L frame with the one or more bolts inserted through corresponding holes and is coupled to the one or more corresponding nuts.

4. The apparatus of claim 1, wherein the shoe comprises a flat rectangular piece having a first side coupled to the pivot coupling and a second opposing side coupled to a rubber sole.

5. The apparatus of claim 1, wherein the plurality of spaced holes of the long arm comprise a first plurality of holes, the slide guide comprising a second plurality of holes extending along a length of the slide guide, wherein a spacing between the first plurality of holes is different than a spacing between the second plurality of holes such that the slide guide is securable along a length of the long arm in increments smaller than the first spacing.

6. A method for supporting an object, the method comprising acts of:
   providing an L frame including a short arm coupled at a substantially right angle to a long arm with each having a plurality of spaced holes extending along each corresponding length;
   providing a slider arm including an extension leg having a slide guide coupled on one end of the extension leg, wherein the slide guide comprises an opening sized to slide over and be secured to the L frame, and a shoe coupled via a pivot coupling to another end of the extension leg; securing the L frame to a support structure;
   sliding the slide guide over the long arm until the shoe abuts the support structure;
   securing the slide guide to the long arm with a fastener; and
   positioning the object such that it is supported by the L frame.

7. The method of claim 6, wherein the act of securing the L frame comprises acts of:
   positioning the long arm over a bottom portion of a window frame; and
   fastening one or more fasteners through corresponding ones of the plurality of holes into a bottom portion of the window frame.

8. The method of claim 6, comprising an act of securing one or more nuts to an underside of the slide guide in a position corresponding to one or more holes through the slide guide, wherein the act of securing the slide guide to the long arm comprises an act of passing one or more fasteners through the one or more holes in the slide guide and the long arm and securing the one or more fasteners to corresponding ones of the one or more nuts.

9. The method of claim 6, wherein the shoe is a flat rectangular piece, the method comprising an act of affixing a rubber sole to a first side of the shoe, wherein the pivot coupling is coupled to the shoe on a second side opposing the first side, and wherein the rubber sole is positioned between the support structure and the first side of the shoe.

10. The method of claim 6 wherein the plurality of spaced holes of the long arm comprise a first plurality of holes, the slide guide comprising a second plurality of holes extending along a length of the slide guide, wherein a spacing between the first plurality of holes is different than a spacing between the second plurality of holes such that the slide guide is securable along a length of the long arm in increments smaller than the first spacing.

11. The method of claim 6, wherein the support structure is a window with a surrounding wall and wherein the act of securing the L frame comprises an act of positioning the short arm of the L frame inside the window extending downwards and the extension leg extending towards the wall with the shoe resting against the wall.

12. The method of claim 6, wherein the support structure is a window with a surrounding wall and wherein the act of securing the L frame comprises an act of positioning the short arm of the L frame inside the window extending upwards across an inside surface of the object and the extension leg extending towards the wall with the shoe resting against the wall such that the object is secured from sliding into the window.

13. The method of claim 6, wherein the support structure is a window with a surrounding wall and wherein the act of securing the L frame comprises an act of positioning the short arm of the L frame outside the window extending upwards across an outside surface of the object and the extension leg extending towards the wall with the shoe resting against the wall such that the object is secured from sliding out of the window.

14. The method of claim 6, wherein the support structure is a window with a surrounding wall and wherein the act of securing the L frame comprises an act of positioning the short arm of the L frame outside the window extending downwards below the object and the extension leg extending towards the wall with the shoe resting against the wall.

15. The method of claim 6, wherein the slider arm is a first slider arm, the extension leg is a first extension leg, the slide guide is a first slide guide and the shoe is a first shoe, the method comprising acts of:
   providing a second slider arm including a second extension leg having a second slide guide coupled on one end of the second extension leg, wherein the second slide guide comprises an opening sized to slide over and be secured to the L frame, and a second shoe coupled via a second pivot coupling to another end of the second extension leg;
   sliding the second slide guide over the long arm with a second extension leg extending downward and away from the first extension leg; and
   securing the second shoe to the object.

16. The method of claim 15, wherein the second pivot coupling is a variable tension pivot which is securable at a desired angle.

* * * * *